March 14, 1933.                J. TOURRIOL                1,901,012

HEADLIGHT FOR VEHICLES

Filed March 31, 1930

J. Tourriol
INVENTOR

By: Marks & Clerk
ATTYS.

Patented Mar. 14, 1933

1,901,012

UNITED STATES PATENT OFFICE

JEAN TOURRIOL, OF PARIS, FRANCE

HEADLIGHT FOR VEHICLES

Application filed March 31, 1930, Serial No. 440,459, and in France April 9, 1929.

The present invention has for its object, the provision of a headlight or searchlight for motor cars and other vehicles of all kinds (trains, tramways, airplanes, boats, motor boats, etc.).

This headlight essentially comprises an optical system operating as a catadioptric searchlight, that is to say utilizing both refraction and reflection of light rays.

An ordinary catadioptric searchlight is constituted by a divergent lens, having two spherical faces, silvered on its convex face. With suitable curvatures, a cylindrical beam is thus obtained. In accordance with the present invention, the optical system is such that about one half of the beam is cylindrical (which remains parallel to the route followed by the vehicle), whilst the remainder of the beam is spread from the vehicle to the horizon, owing to a modification of the curvature of the optical system, modification effected either on the front face (refracting face) or on the rear face (reflecting face).

A beam is thus obtained which lights the road from the vehicle to a great distance without exceding the prescribed height above the road.

The beam cannot therefor incommodiously dazzle the passers-by.

The accompanying drawing, given by way of example, will allow the subject-matter of this invention to be clearly understood.

In these figures, 1 designates a divergent lens silvered on its rear face $a\ b\ c$, and $d$ designates a source of light having a surface as small as possible.

In accordance with the present invention, the lens is shaped so that it produces, by means of a portion of its surface, a cylindrical beam, and, by means of another portion, a divergent beam directed forwardly between the ground and the horizontal plane passing through the axis $b\ f\ d$.

Figure 1:
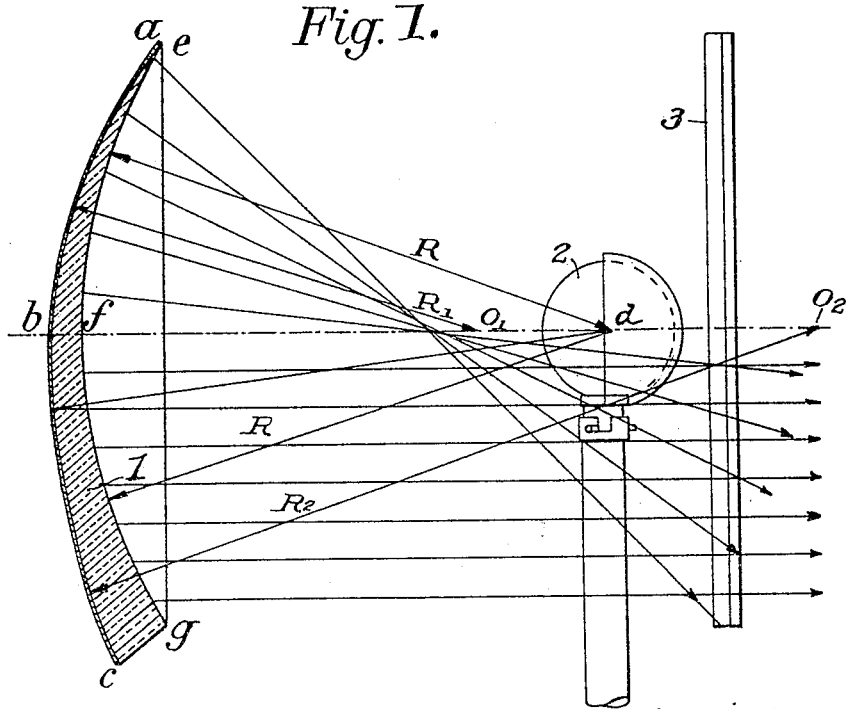
Fig. 1 is a vertical section of an optical system the upper half of which gives a convergent beam whilst the lower one gives a cylindrical beam.

As shown in Fig. 1, the upper portion $a\ b$ $e\ f$ of the optical system is rendered convergent, by giving to its rear face a radius of curvatures smaller than in the normal catadioptric reflector. The upper portion of the beam is thus lowered towards the ground, whilst the lower part $b\ c\ f\ g$ of the reflector preserves the normal shape and gives a horizontal beam.

Instead of changing the shape of the rear surface of the lens, the shape of its front face can be modified in an equivalent manner.

Figure 2:
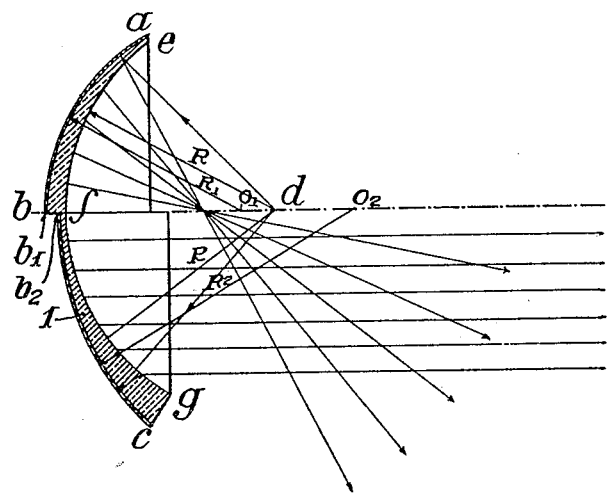
Fig. 2 is a similar section of another optical system giving the same result.

As shown in Fig. 2, the lens is constituted in its upper half by a convergent semi-meniscus, and in its lower half by a divergent semi-meniscus, as in the case of Fig. 1; but the thickness of the lower meniscus is reduced, so that according to the horizontal diametral plane, the adjacent portions of the two semi-menisci have different thicknesses; their concave front surfaces $e\ f$ and $f\ g$ are joined together, whilst their convex rear surfaces $a\ b$ and $b_2\ c$ form a shoulder $b_1 - b_2$. The two semi-menisci can be glued to each other along their rectilinear edge or simply held on each other by a mounting (not shown) which surrounds them. The upper semi-meniscus has its rear and front surfaces converging from the lower edge to the upper and front edge while the lower semi-meniscus has its rear and front surfaces diverging from its upper edge to the lower and front edge.

The source of light $d$ is preferably constituted by a short horizontal filament directed transversely to the optical axis and placed at the center of an electric bulb 2, the face of which turned forwardly, is of spherical shape and silvered, in order to reflect the light towards the lens 1 (Fig. 1).

The mounting of this bulb and its support will be so devised that the correct position of the filament is exactly determined, without fumbling and adjustment, upon assemblage.

The front of the headlight will be closed by a glass plate which, preferably, will be provided with a vertical groove or flute, or will have a prismatic shape, etc., in order to produce a lateral dispersion of the beam and to thus ensure the lighting of the sides of the road without the help of auxiliary lamps.

It is to be noted that the front and rear surfaces of these semi-menisci are each a portion of a sphere while the front surfaces of the semi-menisci in both forms shown have a common radius R with the center located at point $d$. The radii $R_1$ having centers $O_1$ of the rear surfaces of the upper semi-menisci in each form are smaller than the common radius R while the radii $R_2$ having centers $O_2$ of the rear surfaces of the lower semi-menisci are in each form larger than the radius R. All the centers of these spheres are placed on the same horizontal axis passing through the source of light which is disposed in the vicinity of the common center of the front surfaces of the upper and lower semi-menisci.

I claim:

Headlight for vehicles, comprising a source of light, two semi-menisci juxtaposed along their rectilinear edge, the upper semi-meniscus having its rear and front surfaces converging from the lower edge to the upper and front edge, the lower semi-meniscus having its rear and front surfaces diverging from its upper edge to the lower and front edge, a reflecting layer on the rear surfaces of these semi-menisci, the front and rear surfaces of these semi-menisci each being a portion of a sphere, the front surfaces of the semi-menisci having a common radius, the radii of the rear surfaces of the said upper and lower semi-menisci being respectively smaller and larger than the common radius of the front surfaces of these semi-menisci, all the centers of these spheres being placed on the same horizontal axis passing through the source of light which is disposed in the vicinity of the common center of the front surfaces of the upper and lower semi-menisci.

In testimony whereof I have hereunto affixed my signature.

JEAN TOURRIOL.